United States Patent [19]

Hettiger

[11] Patent Number: 4,549,202
[45] Date of Patent: Oct. 22, 1985

[54] TRILEVEL SANDCASTLE PULSE ENCODING/DECODING SYSTEM

[75] Inventor: James Hettiger, Indianapolis, Ind.
[73] Assignee: RCA Corporation, Princeton, N.J.
[21] Appl. No.: 561,330
[22] Filed: Dec. 14, 1983
[51] Int. Cl.$^4$ ............................................. H04N 9/535
[52] U.S. Cl. .................................. 358/17; 358/21 R; 358/178
[58] Field of Search .................... 358/17, 19, 20, 21 R, 358/160, 172, 178; 375/17, 20; 329/105; 328/115

[56] References Cited

U.S. PATENT DOCUMENTS

| | | | |
|---|---|---|---|
| 3,674,918 | 7/1972 | Legler | 178/5.2 R |
| 4,227,181 | 10/1980 | Brittain | 340/167 R |
| 4,263,622 | 4/1981 | Hinn | 358/10 |
| 4,313,130 | 1/1982 | Yost | 358/21 R |
| 4,337,478 | 6/1982 | Harlan | 358/20 |

OTHER PUBLICATIONS

"Integrated NTSC Chrominance/Luminance Processor"–Harwood, et al., IEEE Trans. on Consumer El., (Vol. CE-26), Nov. 1980, pp. 693-706.

Primary Examiner—Michael A. Masinick
Attorney, Agent, or Firm—Eugene M. Whitacre; Paul J. Rasmussen; William H. Meagher

[57] ABSTRACT

A color TV receiver is provided with an encoding/decoding system for a trilevel sandcastle pulse train, exhibiting a middle pulse level during recurring kinescope bias control intervals, and comprising excursions between a base level, a low pulse level, and a high pulse level during periods outside said kinescope bias control intervals. The system's decoder includes a trio of voltage comparators for comparing incoming sandcastle pulses with respective reference voltages derived from three different intermediate points on a common voltage divider connected across the terminals of a DC supply. The system's encoder includes keyed means for determining the middle pulse level of the trilevel sandcastle pulse train in accordance with the output of a second voltage divider connected across the same DC supply as the first voltage divider. An output of a third, selectively enabled, voltage divider, connected across the same DC supply as the first and second voltage dividers, is determinative of said low pulse level. The third divider is subject to modification during base level appearances, with the base level determined by the third divider's modified output during the periods of divider modification. During high pulse level appearances, the third voltage divider is disabled to establish the high pulse level at or near the full output potential of the DC supply.

7 Claims, 3 Drawing Figures

TRILEVEL SANDCASTLE PULSE ENCODING/DECODING SYSTEM

The present invention relates generally to a system wherein timing information is conveyed from a first environment to a second environment through the use of a multilevel pulse train of a so-called "sandcastle" type, and particularly to an encoding/decoding system for sandcastle pulses of a trilevel form which advantageously establishes tracking between one or more pulse levels of the sandcastle pulses formed by the encoder and a plurality of reference levels utilized for comparison purposes in the decoder.

Where a multiplicity of keying functions with different timing requirements are subject to performance within a common integrated circuit, a savings in terminal count may be realized by externally forming a composite, multilevel keying waveform for delivery to a single input terminal of the integrated circuit, and including within the integrated circuit level-sensitive decoder circuits for extracting respective keying waves of different timing from the delivered composite waveform (which is viewable as having a sandcastle-like profile).

An example of encoder circuitry suitable for use in the formation of a sandcastle pulse train with pulse components of two different levels (above a base level) is shown in U.S. Pat. No. 4,313,130, Yost. An example of decoder circuitry suitable for use in separating the pulse components of bilevel sandcastle pulses of the type generated by the Yost encoder is presented in an article entitled "Integrated NTSC Chrominance/Luminance Processor", by L. Harwood, et al., appearing on pages 693–706 of the IEEE Transactions on Consumer Electronics, Volume CE-26 (November 1980).

In the example of the above-discussed Harwood, et al. decoder, a retrace blanking waveform and a burst gating waveform, for use in luminance/chrominance signal processing circuits of a color television receiver, are separately derived from bilevel sandcastle pulses. The bilevel sandcastle pulses exhibit a first level during initial and concluding portions of the recurring periods when retrace blanking is desired, but exhibit a second higher level during intermediate ("backporch") portions of the recurring periods, which intermediate portions coincide in timing with recurring intervals during which the burst gating function is to be performed. In this instance of sandcastle pulse use, there is an overlap of the keying functions to be performed, with retrace blanking continuing through each burst gating period. In the instance of a color television receiver of the type incorporating apparatus for automatic control of color kinescope biasing, set of keying functions, inclusive of non-overlapping as well as overlapping functions, is desirably associated with the receiver's luminance/chrominance signal processing circuits, as explained in the copending U.S. patent application Ser. No. 561,176 of R. Shanley, concurrently filed herewith and entitled "Control System For Luminance/Chrominance Signal Processing Circuits."

An illustrative arrangement for automatic control of color kinescope biasing in a color television receiver is that described in U.S. Pat. No. 4,263,622, Hinn. In the Hinn arrangement, a control period, occupying a period of several successive line intervals within each vertical blanking interval, is set aside for monitoring a black level current produced by an electron gun under reference signal conditions, for detection of departures from a desired current level, and for readjustment of gun bias to oppose the undesired departures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in the U.S. Pat. No. 4,484,228 of R. P. Parker.

For successful use of automatic kinescope bias (AKB) control in the manner exemplified by the structures of the aforementioned Hinn patent and Parker patent, it is recognized in the aforementioned Shanley application that the luminance/chrominance signal processing circuits, which process signal information for delivery to the color kinescope during the time periods intervening the periodically recurring kinescope bias control intervals, require some suitable form of manipulation during the kinescope bias control intervals to avoid undesirable disturbance or contamination of the current monitoring and bias adjustment functions.

To convey to a single chip input terminal timing information identifying the recurring kinescope bias control intervals, in addition to the timing information conveyed by the bilevel sandcastle pulses discussed above, it is proposed herein to employ sandcastle pulses of a trilevel form, i.e., with three different levels (above a base level) for the respective pulse components.

In a trilevel sandcastle pulse encoding/decoding system constructed in accordance with the principles of the present invention, an on-chip decoder arrangement is employed which utilizes a trio of voltage comparators to compare incoming trilevel sandcastle pulses with respectively different reference voltages derived from different intermediate points on a common, on-chip voltage divider coupled across the terminals of a DC potential supply. The level of one of the reference voltages is selected to lie between the base level of the train of trilevel sandcastle pulses developed by the encoder and the lowest of the pulse levels exhibited by the trilevel sandcastle pulse train. The level of a second of the reference voltages is selected to lie between said lowest pulse level and the middle one of the pulse levels exhibited by the trilevel sandcastle pulse train. The level of the third reference voltage is selected to lie between said middle pulse level and the highest of the pulse levels exhibited by the trilevel sandcastle pulse train. In the encoder (external to the integrated circuit bearing the decoder), a keyed circuit determines the middle pulse level exhibited by the trilevel sandcastle pulse train in accordance with a fourth reference voltage derived from the output terminal of an external voltage divider, which is coupled across the same DC potential supply as the first (on-chip) voltage divider. Even though the output potential of the supply may vary with loading changes, temperature variations, etc., tracking of the middle pulse level of the delivered trilevel sandcastle pulse train with the reference voltages supplied to the comparators is ensured, enhancing the reliability of the level discrimination obtained in the decoder.

In accordance with an illustrative embodiment of the present invention, the external encoder also includes a third, selectively enabled, voltage divider connected across the same DC potential supply as the first and second voltage dividers, with the lowest of said pulse levels determined in accordance with the output of the third voltage divider. During appropriately timed periods, the third voltage divider is effectively disabled in a manner causing the highest pulse level to be responsive to the output of said DC potential supply without the dividing effect of the third voltage divider. During periods of absence of all of the pulse components of the trilevel sandcastle pulse train, the third voltage divider is subject to modification of its voltage division ratio, with the base level of the trilevel sandcastle pulse train determined in accordance with a modified output of the third voltage divider during said periods of divider modification. With the above-described utilization of the third voltage divider, tracking between the comparator reference voltages of the decoder and the base level of the pulse train, as well as the lowest and highest pulse levels thereof, is also ensured, to further enhance the reliability of the level discrimination obtained in the decoder.

Figure 1:
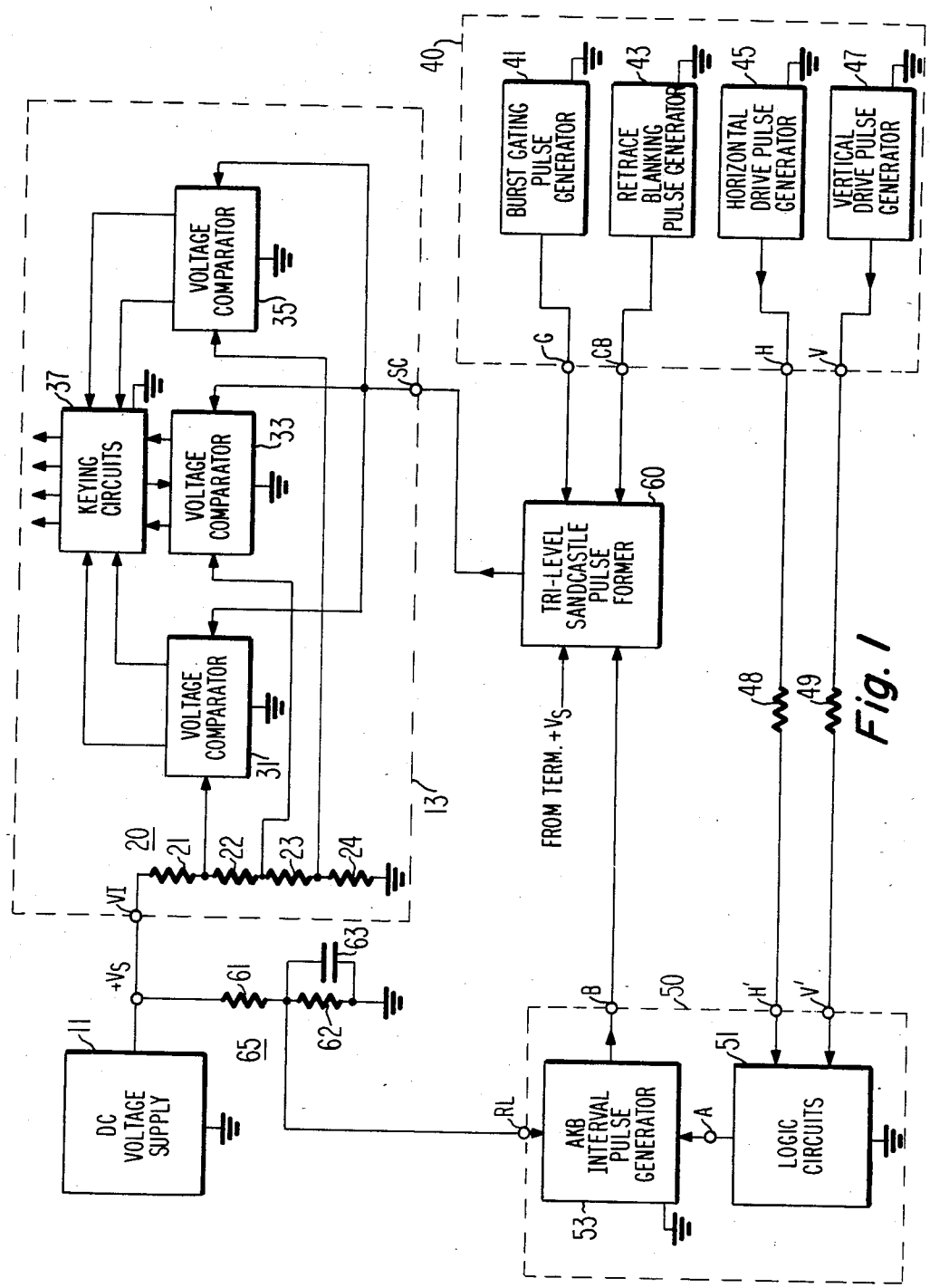
FIG. 1 illustrates, partially schematically and partially by block representation, a portion of a color television receiver incorporating a trilevel sandcastle pulse encoding/decoding system in accordance with an embodiment of the present invention.

In the color television receiver portion illustrated in FIG. 1, a plurality of resistors, 21, 22, 23 and 24, are connected in the order named between the positive terminal ($+V_S$) and the grounded negative terminal of a DC voltage supply 11 to form a voltage divider 20. The resistors (21, 22, 23, 24) are formed on an integrated circuit 13, with the connection from divider 20 to terminal $+V_s$ of the supply 11 (formed external to the IC) being effected via an interface terminal VI of IC 13. Integrated circuit 13 additionally bears luminance/chrominance signal processing circuits (not illustrated) of the color television receiver, which circuits are illustratively of the form disclosed in the aforementioned copending U.S. patent application of R. Shanley.

Respective reference voltages, of successively descending magnitudes, appear at the junction of resistors 21 and 22, at the junction of resistors 22 and 23, and at the junction of resistors 23 and 24, and are supplied as reference inputs to respective voltage comparators 31, 33 and 35, also realized on the integrated circuit 13. Signals comprising a train of trilevel sandcastle pulses (formed in a manner to be described subsequently) are delivered to the interface terminal SC of integrated circuit 13 and supplied therefrom as signal inputs to the respective comparators 31, 33 and 35. Outputs of the respective comparators 31, 33, 35, indicative of the results of comparison of the voltage level of the incoming signals with the respective reference voltages from divider 20, are delivered to on-chip keying circuits 37 to cause development of a plurality of keying waveform outputs used to control various elements of the on-chip luminance/chrominance signal processing circuits. Voltage divider 20, the comparators (31, 33, 35) and the keying circuits 37 form a sandcastle pulse decoder, which may desirably be of the particular form disclosed in a copending U.S. patent application of L. Harwood, et al., Ser. No. 561,331, entitled "Trilevel Sandcastle Pulse Decoder" and concurrently filed herewith. In a decoder form shown in the Harwood, et al. application, the operation of the mid-level voltage comparator 33 is illustratively responsive to an output of the high-level voltage comparator 35 for pulse component discrimination purposes explained in greater detail in said Harwood, et al. application; in reflection of such an operation, FIG. 1 shows voltage comparator 33 as accepting an additional input from an element of the keying circuits 37 that respond to the respective comparator outputs.

Figure 3:
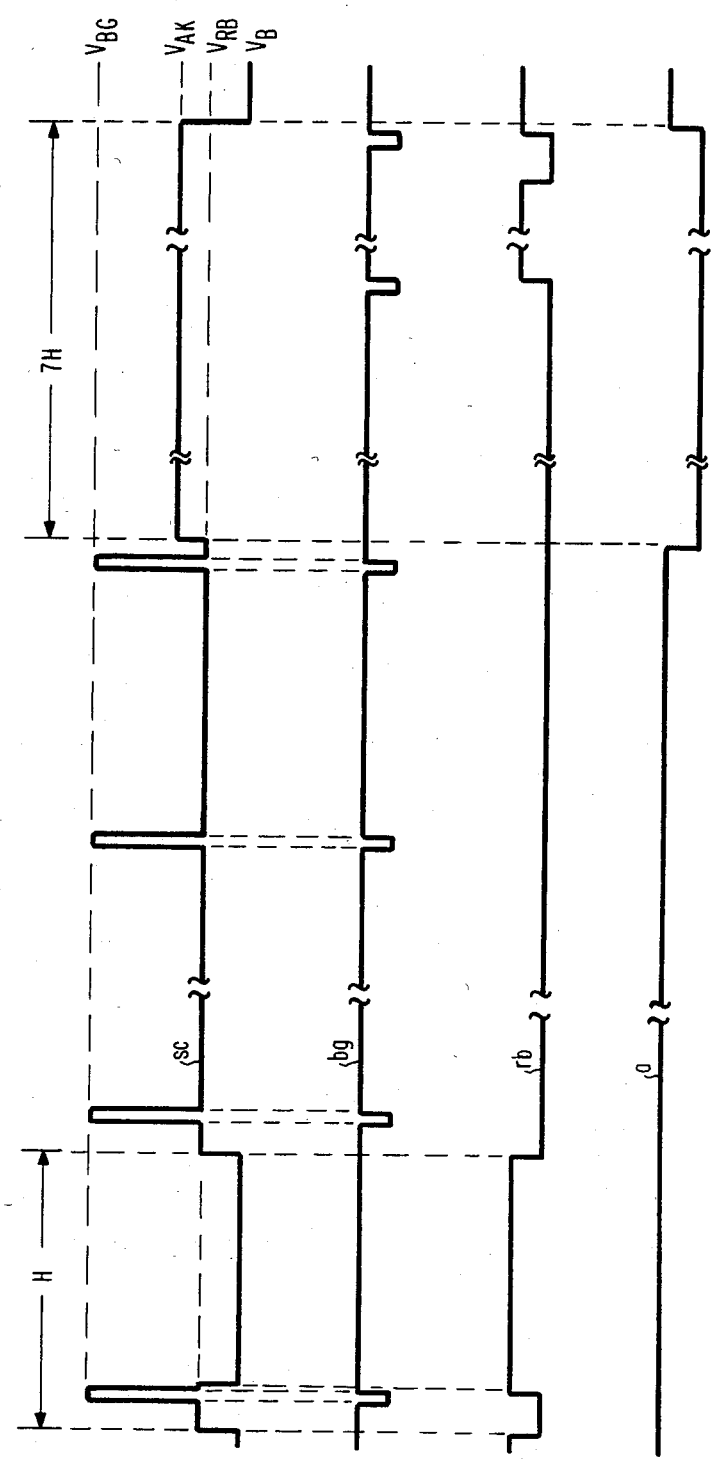
FIG. 3 illustrates graphically waveforms of aid in explaining the operation of the FIG. 1 system.

A trilevel sandcastle pulse train, exhibiting a waveform shown by curve "sc" of FIG. 3, is delivered to terminal SC by a trilevel sandcastle pulse former 60, which receives inputs from (a) terminal $+V_s$ of the DC supply 11, (b) the output terminal (G) of a burst gating pulse generator 41, (c) the output terminal (CB) of a retrace blanking pulse generator 43, and (d) the output terminal (B) of an AKB interval pulse generator 53. The sandcastle pulses of waveform "sc" are of a trilevel character, inclusive of retrace blanking pulse components at a first pulse level ($V_{RB}$) more positive than the base level ($V_B$) of the pulse train, kinescope bias control interval timing pulse components at a second pulse level ($V_{AK}$) more positive than the first pulse level, and burst gating pulse components at a third pulse level ($V_{BG}$) more positive than the second pulse level.

In the arrangement of FIG. 1, the burst gating pulse generator 41 and the retrace blanking pulse generator 43 are realized in integrated circuit form on a second integrated circuit 40, also bearing the receiver's deflection control circuits, which include a horizontal drive pulse generator 45 and a vertical drive pulse generator 47. The output terminals G and CB of the generators 41 and 43 constitute interface terminals of the IC 40. The drive pulse outputs of generators 45 and 47 appear at respective interface terminals H and V of IC 40.

In addition to their delivery to the receiver's horizontal and vertical deflection circuits (not illustrated), the respective drive pulses are coupled via respective resistors 48 and 49 to input terminals H' and V' of logic circuits 51 realized in integrated circuit form on a third integrated circuit 50. The logic circuits 51 function, in response to the inputs from terminals H' and V' to develop a bias control interval timing pulse output at terminal A for delivery as a keying input to the AKB interval pulse generator 53 (also realized in integrated circuit form on IC 50). The integrated circuit 50 desirably also bears the receiver's automatic kinescope bias control circuits (not illustrated), which may advantageously be of the form disclosed in the aforementioned Parker patent (which also shows a suitable arrangement for implementing the function of logic circuits 51).

Illustratively, the keying waves supplied from terminal A to generator 53 have a waveform as shown by curve "a" in FIG. 3, and comprise recurring field rate pulses timed to occupy a seven-line period within a post-sync portion of the vertical blanking interval of the received signals, which period defines the kinescope bias control interval.

Pursuant to the principles of the present invention, the AKB interval pulse generator 53 cooperates with the trilevel sandcastle pulse former 60 to determine the second (middle) pulse level ($V_{AK}$) of the trilevel sandcastle pulse train during each of the recurring bias control intervals in accordance with the output of a second voltage divider (65) connected across the output terminals of the DC voltage supply 11. The second voltage divider 65 is formed by resistors 61 and 62, connected in the order named between supply terminal $+V_S$ and ground. A filter capacitor 63 is connected in shunt with divider resistor 62. The voltage division ratio associated with divider 65 is selected to fall between the respective voltage division ratios associated with the outputs of the first voltage divider 20 that appear, respectively, at the junction of resistors 21 and 22, and at the junction of resistors 22 and 23. The output of the second voltage divider 65 is supplied as a reference level input to the AKB interval pulse generator 53 via an interface terminal RL of IC 50.

Figure 2:
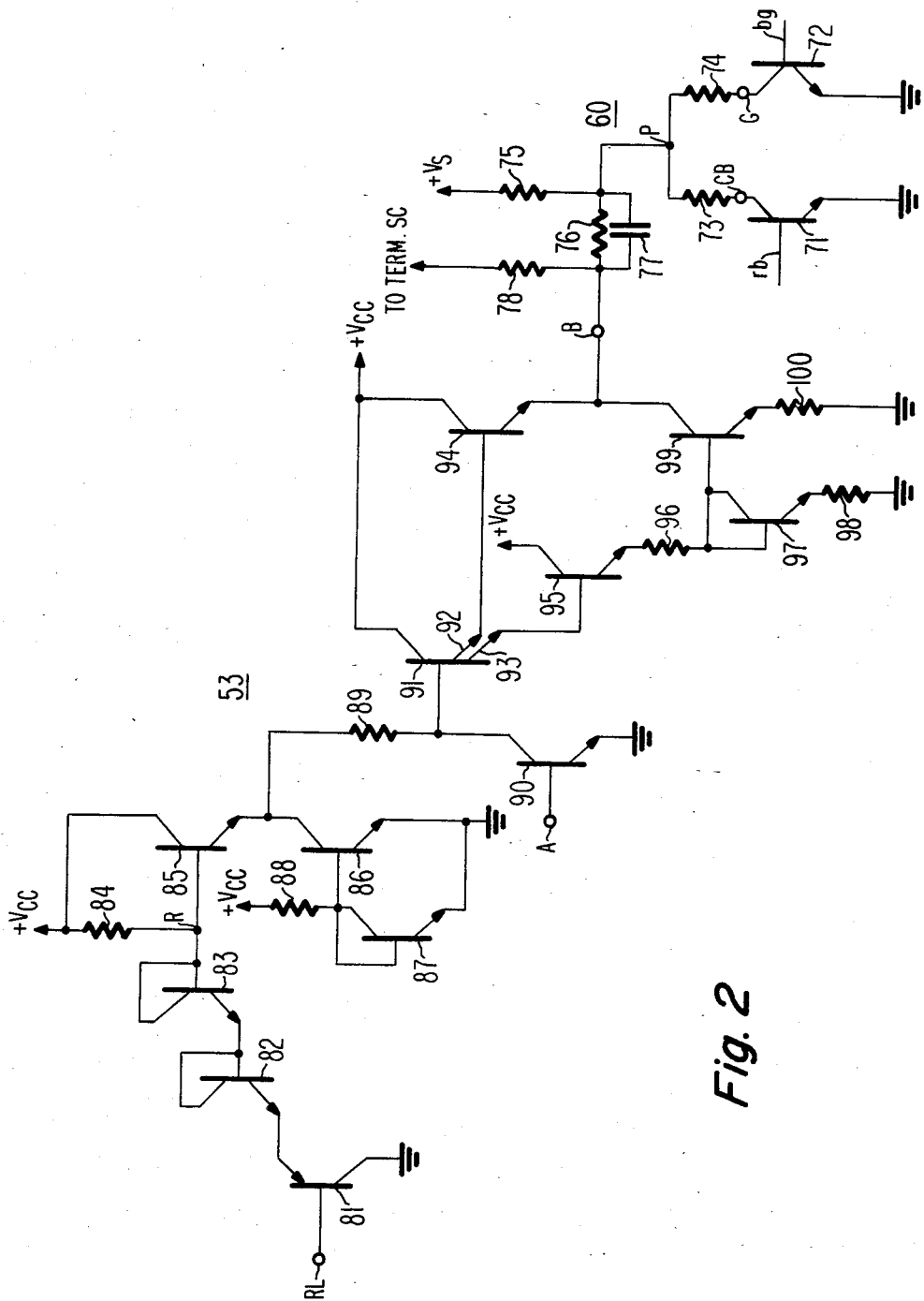
FIG. 2 shows a schematic of illustrative circuits for implementing certain of the functions of the system of FIG. 1.

For an understanding of illustrative techniques that may be employed to achieve the desired control of the $V_{AK}$ level of the trilevel sandcastle pulse train in accordance with the reference level output of divider 65, attention should now be directed to FIG. 2, which shows schematic details for circuits implementing the functions of the trilevel sandcastle pulse former 60 and the AKB interval pulse generator 53 pursuant to a specific embodiment of the present invention.

In FIG. 2, the respective output devices of the burst gating pulse generator 41 and the retrace blanking pulse generator 43 of IC 40 of the FIG. 1 system are shown as respective NPN transistors 72 and 71, disposed with their emitter electrodes grounded and with their collector electrodes respectively connected to the IC interface terminals G and CB. Terminals G and CB are connected via respective resistors 74 and 73 to a terminal P, linked by a resistor 75 to the positive supply terminal ($+V_S$) of the DC voltage supply 11.

Curve "rb" of FIG. 3 illustrates the waveform of a train of negative-going retrace blanking pulses which are applied to the base electrode of transistor 71. Curve "bg" of FIG. 3 illustrates the waveform of a train of negative-going burst gating pulses which are applied to the base electrode of transistor 72.

The retrace blanking waveform "rb" includes relatively wide pulse components, recurring at a field rate, which encompass the recurring periods of vertical retrace of the beams of the receiver's color kinescope, and narrower pulse components, recurring at a line rate, which encompass periods of horizontal retrace of said beams lying outside of the vertical retrace blanking intervals. The retrace blanking waveform "rb" is readily subject to formation by combination of suitably timed signals derived from the receiver's horizontal and vertical deflection circuits.

The burst gating waveform "bg" includes pulse components, narrower in width than the horizontal retrace blanking pulse components, which are timed to coincide with "backporch" segments of the horizontal blanking portion of recurring line intervals of the received signals. Illustrative circuitry for developing the burst gating waveform "bg" is disclosed in the copending U.S. patent application Ser. No. 527,889 of R. Fernsler, et al.

A resistor 76 (shunted by a speed-up capacitor 77) links terminal P to the output terminal (B) of the circuitry performing the function of the AKB pulse generator 53 of the FIG. 1 system, and an additional resistor 78 links terminal B to the sandcastle pulse former output terminal SC.

In the FIG. 2 arrangement, the reference level input terminal RL of generator 53 is directly connected to the base electrode of a PNP transistor 81, disposed with its collector electrode grounded. The emitter electrode of transistor 81 is directly connected to the emitter electrode of a first diode-connected NPN transistor 82. The joined base and collector electrodes of transistor 82 are directly connected to the emitter electrode of a second diode-connected transistor 83. The joined base and collector electrodes of transistor 83 are connected via a resistor 84 to the positive terminal ($+V_{cc}$) of an operating potential supply different from that associated with terminal $+V_S$.

Current supplied via resistor 84 forward biases the base-emitter junctions of transistors 81, 82, 83, resulting in development of a potential at terminal R (at the junction of resistor 84 and transistor 83) which is offset in the positive direction from the reference voltage at terminal RL by a voltage (3 $V_{be}$) equal to three times the magnitude of the offset potential ($V_{be}$) exhibited by a forward biased base-emitter junction.

Terminal R is directly conected to the base electrode of an NPN transistor 85 disposed as an emitter-follower, with its collector electrode directly connected to the $+V_{cc}$ supply terminal. An NPN transistor 86, disposed with its collector electrode directly connected to the emitter electrode of transistor 85, and with its emitter electrode grounded, serves as a current source for the emitter-follower transistor 85. The current drawn by the current source transistor 86 is determined by a biasing circuit comprising a resistor 88 connected between the $+V_{cc}$ supply terminal and the base electrode of transistor 86, and a diode-connected NPN transistor 87 shunting the base-emitter path of transistor 86. The diode-connected transistor 87 is disposed with its joined base and collector electrodes directly connected to the base electrode of transistor 86, and with its emitter electrode grounded.

A resistor 89 links the emitter electrode of the emitter-follower transistor 85 to the base electrode of a multiple-emitter NPN transistor 91, disposed with its collector electrode directly connected to the $+V_{cc}$ supply terminal. An NPN control transistor 90 is disposed with its collector electrode directly connected to the base electrode of the multiple-emitter transistor 91, with its emitter electrode grounded, and with its base electrode connected to the keying wave input terminal A.

A first emitter electrode (92) of transistor 91 is directly connected to the base electrode of a first NPN output transistor 94. Output transistor 94 is arranged with its emitter electrode directly connected to the output terminal B, and with its collector electrode directly connected to the $+V_{cc}$ supply terminal.

A second emitter electrode (93) of transistor 91 is directly connected to the base electrode of an NPN emitter-follower transistor 95, disposed with its collector electrode directly connected to the $+V_{cc}$ supply terminal. A resistor 96 links the emitter electrode of emitter-follower transistor 95 to the base electrode of a second NPN output transistor 99, disposed with its collector electrode directly connected to output terminal B. A resistor 100 returns the emitter electrode of output transistor 99 to ground. A diode-connected NPN transistor 97 is arranged with its joined base and collector electrodes directly connected to the base electrode of output transistor 99, and with its emitter electrode returned to ground via a resistor 98.

In operation of the FIG. 2 arrangement, when a negative-going AKB control interval timing pulse component of waveform "a" appears at the keying wave input terminal A, control transistor 90 is cut off. Under these circumstances, the potential at the base electrode of transistor 91 is elevated sufficiently to enable transistors 91, 94, 95, 97 and 99 to simultaneously conduct. With output transistors 94 and 99 conducting, the generator 53 presents a very low impedance to output terminal B. With the output impedance of generator 53 appreciably lower than the impedance exhibited by resistor 76 during each keying interval, terminal B is effectively clamped to a potential which is offset in a negative direction from the potential at terminal R by a 3 $V_{be}$ amount (neglecting as insignificant the slight voltage drop developed across resistor 89 by the base current of the conducting transistor 91). With the negative offset introduced by the voltage drops across the forward-biased base-emitter junctions of transistors 85, 91 and 94 effectively canceling the effects of the positive offset introduced by the voltage drops across the forward-biased base-emitter junctions of transistors 81, 82, and 83, the output potential at terminal B during each keying interval is directly determined by (and in this instance, substantially equal to) the reference voltage at the reference level input terminal RL (and is effectively independent of the supply potential at the operating potential supply terminal $+V_{cc}$, and any variations to which such supply potential may be subject).

During periods outside the AKB control interval, when waveform "a" at the keying wave input terminal A exhibits its base level, control transistor 90 is rendered conducting to depress the potential at the base electrode of transistor 91 sufficiently so as to disable transistors 91, 94, 95, 97 and 99. With output transistors 94 and 99 simultaneously cut off under these circumstances, the output of generator 53 is effectively open-circuited and output terminal B is free to follow the voltage excursions at terminal P.

To appreciate the nature of the voltage excursions at terminal P, one must consider the effects of the keying of transistors 71 and 72. During the appearance of a negative-going retrace blanking pulse component at the base electrode of transistor 71, transistor 71 is cut off. During the periods intervening the successive retrace blanking pulse components, transistor 71 is strongly conducting. During the appearance of a negative-going burst gating pulse component at the base electrode of transistor 72, transistor 72 is cut off. During the periods intervening the successive burst gating pulse components, transistor 72 is strongly conducting.

As a consequence of the above-described operations, a train of sandcastle pulses of bilevel form is developed at terminal P. During periods of coincidence of the base levels of waveforms "rb" and "bg" (e.g., during trace portions of active line intervals), transistors 71 and 72 are simultaneously conducting. Under these circumstances, a voltage divider is formed across the DC voltage supply 11, which divider comprises resistor 75 in series with the parallel combination of resistors 73 and 74. The voltage division ratio of this voltage divider is such as to establish a base level at terminal P at a relatively low positive potential.

During appearances of those portions of each retrace blanking pulse component of waveform "rb" which do not coincide with appearances of the burst gating pulse components of waveform "bg", transistor 71 is cut off while transistor 72 is in a conducting state. Under such circumstances, resistor 73 is open-circuited and a modified voltage divider is formed across the supply 11, which modified voltage divider comprises resistor 75 in series with resistor 74 only. The voltage division ratio of the modified voltage divider is such as to elevate the potential at terminal P to a retrace blanking pulse level more positive than the aforementioned base level.

During appearances of the burst gating pulse components of waveform "bg" (which always coincide with appearances of portions of the retrace blanking pulse components of waveform "rb"), transistors 71 and 72 are simultaneously cut off. Under such circumstances, resistors 73 and 74 are both open-circuited, and the potential at terminal P rises to a burst gating pulse level, higher than the retrace blanking pulse level, and at, or in the vicinity of, the potential at supply terminal $V_S$.

Due to the previously explained clamping effect of the operation of generator 53, the excursions between base, retrace blanking, and burst gating levels at terminal P are not followed at terminal B during each bias control interval. During the intervening periods, however, the potential at terminal B is free to follow such excursions. As a consequence, the pulse train delivered to terminal SC is of the desired trilevel form shown by waveform "sc".

The middle pulse level ($V_{AK}$) of the delivered trilevel sandcastle pulse train is determined, as explained above, by the output of the second voltage divider 65 (FIG. 1) supplied to terminal RL. The lowest pulse level ($V_{RB}$) of the delivered trilevel sandcastle pulse train is determined in accordance with the output of an additional voltage divider (75, 74) coupled across the output terminals of supply 11. The resistance values for resistors 75 and 74 are selected so as to associate a voltage division ratio with this additional voltage divider which falls between the respective voltage division ratios associated with the outputs of the first voltage divider 20 (FIG. 1) that appear, respectively, at the junction of resistors 22 and 23, and at the junction of resistors 23 and 24.

The base level ($V_B$) of the delivered trilevel sandcastle pulse is determined in accordance with the output of divider 75, 74 when modified by the effective shunting of resistor 74 by resistor 73. The resistance value for resistor 73 is selected so as to associate a voltage division ratio with the modified voltage divider 75, 74/73 which ensures a base level significantly below the reference voltage developed at the junction of resistors 23 and 24.

The disabling of the additional divider by the concurrent open-circuiting of resistors 73 and 74 permits determination of the highest pulse level ($V_{BG}$) at, or in the vicinity of, the potential at the supply terminal $+V_S$. In one contemplated use of the FIG. 2 arrangement, the associated decoder includes a PNP clamping transistor with its emitter electrode linked to terminal SC, with its collector electrode grounded, and with its base electrode connected to an additional intermediate point on voltage divider 20, located between terminal $+V_S$ and the junction of resistors 21 and 22. With use of such a clamping transistor, the burst gating pulse level of the pulse train delivered to the comparators (31, 33, 35; FIG. 1) will be clamped to the reference voltage exhibited at said additional intermediate point of divider 20. In the absence of the clamping transistor, the burst gating pulse level of the delivered sandcastle pulse train effectively corresponds directly to the potential at terminal $+V_S$. In either instance, a desirable tracking relationship is established between the burst gating pulse level ($V_{BG}$) and the reference inputs to the comparators.

Thus, in operation of the illustrative embodiment of the present invention, tracking between the various levels of the trilevel sandcastle pulse train and the reference inputs to the decoder's comparators is automatically obtained, assuring reliable discrimination between the respective pulse train levels by the comparators, as desired for accurate decoding, despite the occurrence of supply variations.

One contemplated output of the keying circuits 37 of FIG. 1 comprises burst gating pulse components, separated from the trilevel sandcastle pulses at terminal SC, for use in voltage comparator keying in a system for stabilization of the DC levels of the color signal outputs of the luminance/chrominance signal processing circuits on IC 13. In a copending U.S. patent application of R. Shanley, et al., Ser. No. 561,280 entitled "Keyed DC Stabilization System With Protection From Error Introduction During Vertical Sync Interval" and concurrently filed herewith, it is recognized as desirable, for error reduction purposes, that keying of the stabilization system's comparators should be precluded during at least a portion of each vertical sync interval of the received signal. Moreover, it is proposed therein, to ensure such keying prevention, that the trilevel sandcastle pulses which are delivered to the luminance/chrominance IC should be freed of at least some of the burst gating pulse components during the vertical sync interval. A desirable technique for achieving the selective elimination of the burst gating pulse components is disclosed in a copending U.S. patent application of T. Yost, Ser. No. 561,332 entitled "Backporch Gating Pulse Generator Subject to Disabling During Vertical Sync Interval" and concurrently filed herewith. In the Yost patent application, a modification of the burst gating pulse generator circuitry disclosed in the aforementioned copending Fernsler, et al. application is disclosed in which gating pulse generation is suppressed throughout a selected portion of each vertical sync interval.

Accordingly, in one contemplated embodiment of the present invention, the burst gating pulse generator employed to supply an input to transistor 72 in the FIG. 2 arrrangement desirably incorporates gating pulse generation suppression during vertical sync intervals in the manner of the aforementioned Yost patent application. In such an arrangement, the pulse train delivered to the base electrode of transistor 72 will exhibit a version of the waveform "bg" in which burst gating pulses are absent during at least a selected portion of the vertical sync interval. The resultant trilevel sandcastle pulse train appearing at terminal SC will conform to a version of the waveform "sc" in which excursions to the $V_{BG}$ level are absent throughout the selected portion of vertical sync interval.

What is claimed is:

1. In a signal translating system, including signal processing circuits disposed on an integrated circuit chip, apparatus comprising the combination of:
   means, external to said integrated circuit chip, for supplying a train of trilevel pulses, inclusive of first pulse components exhibiting a first voltage level, second pulse components exhibiting a second voltage level lower than said first voltage level, and third pulse components exhibiting a third voltage level intermediate said first and second voltage levels, to a terminal of said integrated circuit chip;
   a source of DC potential;
   a first voltage divider, disposed on said integrated circuit chip and connected across said DC potential source;
   a first voltage comparator, disposed on said integrated circuit chip, for comparing the voltage level of said pulse train with the level of a first reference voltage; said first voltage comparator having a reference input connected to a first intermediate point on said first voltage divider, at which said first reference voltage appears, and a signal input coupled to said chip terminal;
   a second voltage comparator, disposed on said integrated circuit chip, for comparing the voltage level of said pulse train with the level of a second reference voltage, less than said first reference voltage; said second voltage comparator having a reference input connected to a second intermediate point on said first voltage divider, at which said second reference voltage appears, and a signal input coupled to said chip terminal;
   a third voltage comparator, disposed on said integrated circuit chip, for comparing the voltage level of said pulse train with the level of a third reference voltage, intermediate said first and second reference voltages; said third voltage comparator having a reference input connected to a third intermediate point on said first voltage divider, at which said third reference voltage appears, and a signal input coupled to said chip terminal; and
   means, disposed on said integrated circuit chip and responsive to outputs of said voltage comparators, for controlling the operation of said signal processing circuits;
   wherein said trilevel pulse train supplying means includes:
   a second voltage divider, external to said integrated circuit chip and connected across said DC potential source; said second voltage divider having a divider output terminal exhibiting a voltage division ratio intermediate the voltage division ratios exhibited at said first and third intermediate points on said first voltage divider; and
   means, disposed external to said integrated circuit chip, coupled to said divider output terminal, and operative during appearances of said third pulse components, for determining the voltage level of said pulse train during said appearances of said third pulse components in accordance with the voltage appearing at said divider output terminal.

2. Apparatus in accordance with claim 1, wherein said signal translating system comprises a color television receiver for displaying color images in response to composite video signals inclusive of respective image-representative luminance and chrominance components, said image-representative components being absent during horizontal blanking portions of successive line intervals within periodic field intervals, and also absent during the vertical blanking portion of each field interval, wherein said signal processing circuitry processes said image-representative luminance and chrominance components, and wherein each of said third pulse components of said pulse train encompasses a plurality of successive line intervals within one of said vertical blanking portions.

3. Apparatus in accordance with claim 2, wherein said trilevel pulse train supplying means also includes:
   a third, selectively enabled, voltage divider, external to said integrated circuit chip and connected across said DC potential source; said third voltage divider having a second divider output terminal normally exhibiting a voltage division ratio intermediate the voltage division ratios exhibited at said second and third intermediate points on said first voltage divider; and means, external to said integrated circuit chip, for determining the voltage level of said pulse train in accordance with the voltage at said second divider output terminal during the appearances of said second pulse components.

4. Apparatus in accordance with claim 3, wherein said trilevel pulse train supplying means also includes:

means, external to said integrated circuit chip, for effectively disabling said third voltage divider during appearances of said first pulse components in such manner as to cause the voltage level of said pulse train to be responsive to the output of said DC potential source without the dividing effect of said third voltage divider during said appearances of said first pulse components.

5. Apparatus in accordance with claim 4 wherein said first pulse components of said pulse train normally recur at a line rate, but are absent during appearances of said third pulse components, and each of said first pulse components is timed to coincide with a backporch segment of the horizontal blanking portion of a line interval.

6. Apparatus in accordance with claim 5 wherein said second pulse components of said pulse train occur during segments of said horizontal and vertical blanking portions not overlapping with said second and third pulse components.

7. Apparatus in accordance with claim 6 wherein said third voltage divider is subject to modification during periods of absence of all said pulse components in such manner as to then exhibit, at said second divider output terminal, a voltage division ratio smaller than the voltage division ratio exhibited at said second intermediate point on said first voltage divider; the base level of said pulse train being determined in accordance with the voltage at said second divider output terminal during said periods of absence of all said pulse components.

* * * * *